United States Patent
Adya et al.

(10) Patent No.: US 9,280,632 B2
(45) Date of Patent: Mar. 8, 2016

(54) METHODS AND APPARATUSES FOR CIRCUIT DESIGN AND OPTIMIZATION

(71) Applicant: Synopsis, Inc.

(72) Inventors: Saurabh Adya, San Jose, CA (US); Kenneth S. McElvain, Los Altos, CA (US); Gael Paul, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/668,113

(22) Filed: Nov. 2, 2012

(65) Prior Publication Data

US 2013/0061195 A1    Mar. 7, 2013

Related U.S. Application Data

(62) Division of application No. 12/363,212, filed on Jan. 30, 2009, now Pat. No. 8,307,315.

(51) Int. Cl.
*G06F 17/50* (2006.01)

(52) U.S. Cl.
CPC ........ *G06F 17/5072* (2013.01); *G06F 17/5045* (2013.01)

(58) Field of Classification Search
CPC ............ G06F 17/5072; G06F 17/5027; G06F 17/5054; G06F 11/25; G06F 17/5072
USPC ................................................. 716/100, 119
See application file for complete search history.

(56) References Cited

U.S. PATENT DOCUMENTS

| 5,712,793 A | 1/1998 | Scepanovic et al. |
| 6,145,117 A | 11/2000 | Eng |

(Continued)

FOREIGN PATENT DOCUMENTS

| CN | 1539114 A | 10/2004 |
| CN | 1656486 A | 8/2005 |

(Continued)

OTHER PUBLICATIONS

Betz, V., et al., Architecture and CAD for Deep_Submicron FPGAs, book, Springer Series, 1999, Abstract, 1 page.

(Continued)

*Primary Examiner* — Jack Chiang
*Assistant Examiner* — Brandon Bowers
(74) *Attorney, Agent, or Firm* — HIPLegal LLP; Judith A. Szepesi

(57) ABSTRACT

In one aspect of an embodiment, a method implemented on a data processing system for circuit design, includes identifying one or more first portions of a design of a circuit, each of the one or more first portions containing a set of elements interconnected via timing nets and generating weights for the timing critical nets, the weights being generated after identifying the one or more first portions and executing a placer algorithm which uses the weights for the timing critical nets to place the set of elements on a representation of the design. In this method, in one embodiment, the weights for the timing critical nets can be generated to have values that differ from weights for non-critical nets. The placer algorithm can be any one of a variety of conventional placer algorithms such as a weighted wire length driven placer algorithm or a force directed timing driven placer algorithm or a min-cut placer algorithm.

20 Claims, 22 Drawing Sheets

(56) References Cited

U.S. PATENT DOCUMENTS

| | | | |
|---|---|---|---|
| 6,249,903 | B1 | 6/2001 | McSherry et al. |
| 6,360,356 | B1 | 3/2002 | Eng |
| 6,415,426 | B1 | 7/2002 | Chang et al. |
| 6,480,991 | B1 * | 11/2002 | Cho et al. ............... 716/122 |
| 6,493,863 | B1 | 12/2002 | Hamada et al. |
| 6,519,754 | B1 | 2/2003 | McElvain et al. |
| 6,711,729 | B1 | 3/2004 | McElvain et al. |
| 7,010,769 | B2 | 3/2006 | McElvain et al. |
| 7,143,367 | B2 | 11/2006 | Eng |
| 7,337,100 | B1 | 2/2008 | Hutton et al. |
| 7,788,625 | B1 | 8/2010 | Donlin et al. |
| 7,827,510 | B1 | 11/2010 | Schubert et al. |
| 8,307,315 | B2 * | 11/2012 | Adya et al. ............... 716/108 |
| 2003/0005398 | A1 * | 1/2003 | Cho et al. ............... 716/8 |
| 2003/0009734 | A1 | 1/2003 | Burks et al. |
| 2004/0083443 | A1 | 4/2004 | Ogawa et al. |
| 2007/0150846 | A1 | 6/2007 | Furnish et al. |
| 2007/0204252 | A1 * | 8/2007 | Furnish et al. ............... 716/10 |
| 2008/0072184 | A1 | 3/2008 | Zhou et al. |
| 2009/0031277 | A1 | 1/2009 | McElvain et al. |
| 2009/0031278 | A1 | 1/2009 | McElvain et al. |
| 2009/0044155 | A1 | 2/2009 | Drumm et al. |
| 2009/0254874 | A1 * | 10/2009 | Bose ............... 716/6 |
| 2010/0199234 | A1 * | 8/2010 | Adya et al. ............... 716/2 |
| 2012/0110539 | A1 | 5/2012 | Birch et al. |

FOREIGN PATENT DOCUMENTS

| | | |
|---|---|---|
| CN | 1687934 A | 10/2005 |
| CN | 1851717 A | 10/2006 |
| JP | 05-342290 | 12/1993 |
| JP | 06-266801 | 9/1994 |
| JP | 08-202758 | 8/1996 |
| JP | 10-171857 | 6/1998 |
| JP | 11-085819 | 3/1999 |
| JP | 01-142922 A | 5/2001 |
| JP | 04-164627 A | 6/2004 |
| WO | WO 2007/020391 A1 | 2/2007 |

OTHER PUBLICATIONS

"Synplicity's Industry-Leading FPGA Synthesis Product Adds Support for Altera's New Stratix II FPGAs," 2004 Press Release Archive, 2 pages.

Various, The Syndicated, A Technical Newsletter for ASIC and FPGA Designers, vol. 4, issue 1, 2004, 8 pages.

Hu, Bo, "Timing-Driven Placement for Heterogeneous Field Programmable Gate Array," IEEE/ACM International Conference on Computer-Aided Design, Nov. 2006 (ICCAD '06), pp. 383-388.

Adya, Saurabh N, et al, "Unification of Partitioning, Placement and Floorplanning," Intl. Conference on Computer-Aided Design (ICCAD 2004), pp. 550-557.

"Amplify FPGA Physical Optimizer User Guide," Chapter 4, Feb. 2004, pp. 12-20.

Chan, Tony, et al, "Multilevel Generalized Force-Directed Method for Circuit Placement," Proceedings of the International Symposium on Physical Design, Apr. 2005, pp. 185-192.

Eisenmann, H., et al., "Generic global placement and floorplanning," Proc Design Automation Conference, 1998, pp. 269-274.

Kahng, Andrew B, et al, "Architecture and Details of a High Quality, Large-Scale Analytical Placer," Proc. ACM/IEEE Intl. Conference on Computer-Aided Design, Nov. 2005 pp. 890-897.

Maidee, Pongstorn, et al, "Fast Timing-Driven Partitioning-Based Placement for Island Style FPGAs," 40TH Design Automation Conference, Anaheim, CA, Jun. 2-6, 2003, 38 pages.

"ProASICPlus Actel's 2nd Generation Reprogrammable Flash FPGAs," Actel (now Microsemi), accessed Apr. 28, 2011 at http://www.actel.com/products/proasicplus/, 4 pp.

Spindler, Peter, et al, "Fast and Robust Quadratic Placement Combined with an Exact Linear Net Model," ICCAD '06: Proceedings of the 2006 IEEE/ACM International Conference on Computer-Aided Design, Nov. 2006, pp. 179-186.

"Synplicity FPGA Synthesis Reference Manual," Chapter 3, Jan. 2005, p. 48.

"Synplicity FPGA Synthesis Reference Manual," Chapter 7, Jan. 2005, pp. 70-74.

"Synplicity FPGA Synthesis User Guide," Chapter 4, Jan. 2005, pp. 86-102.

Japanese Patent Application No. 2010-518222, Office Action, Issuance date Apr. 12, 2013, 4 pages (English Translation) [P1116JP].

Japanese Patent Application No. 2010-518234, Office Action, Issuance date Apr. 12, 2013, 6 pages (English Translation) [P1117JP].

Chinese Patent Application No. 2008-80100011.X, Office Action, Issuance date May 22, 2013, 5 pages (English Translation) [P1116CN].

European Patent Application No. 08794757.8, Examination Report, Dated May 7, 2010, 4 pages (P1117EP).

Chinese Patent Application No. 200810100093.8, Third Notification of Office Action, Date of Issue Feb. 26, 2013, 8 pages (P1117CN).

Chinese Patent Application No. 2008-20100011.X, Fourth Notification of Office Action, Date of Issue Sep. 30, 2013, 4 pages (P1116CN).

Japanese Patent Application No. 2010-518222, Office Action, Issuance date Nov. 18, 2013, 3 pages (English Translation) [P1116JP].

Japanese Patent Application No. 2010-518234, Office Action, Issuance date Nov. 20, 2013, 1 page (English Translation) [P1117JP].

Chinese Patent Application No. 2008-80100011.X, Fifth Notification of Office Action, Date of Issue Feb. 8, 2014, 7 pages (English Translation) (P1116CN).

Chinese Patent Application No. 200880100011.X, Search Report, Dated Feb. 8, 2014, 1 page (P1116CN).

Donath et al., "Transformational placement and synthesis", Design, Automation and Test in Europe Conference and Exhibition 2000. Proceedings, pp. 194-201, Mar. 2000.

* cited by examiner

| Island/Path Name | Slack | Clock Domain | Path Start Point | Path End Point | Total path delay |
|---|---|---|---|---|---|
| Island 1 | -1.00 | Clk[rising] on pin clk | Dmux ALUA[0]/regout | UC_ALU_ALUZ/datad | 7.006 |
| Path 1 | -1.00 | Clk[rising] on pin clk | Dmux ALUA[0]/regout | UC_ALU_ALUZ/datad | 7.006 |
| Path 2 | -0.90 | Clk[rising] on pin clk | Dmux ALUA[0]/regout | UC_ALU_ALUZ/datad | 6.993 |
| Path 3 | -0.85 | Clk[rising] on pin clk | Dmux ALUA[0]/regout | UC_ALU_ALUZ/datad | 6.978 |
| Island 2 | -0.91 | Clk[rising] on pin clk | SP_REG.INST[3]/regout | PrgmCntr_PC_i[0]/dataa | 5.009 |
| Island 3 | -0.87 | Clk[rising] on pin clk | GP_REG.INST[1]/regout | PrgmCntr_PC_i[2]/datab | 4.972 |

Cross Probe    Detail

Fig. 3

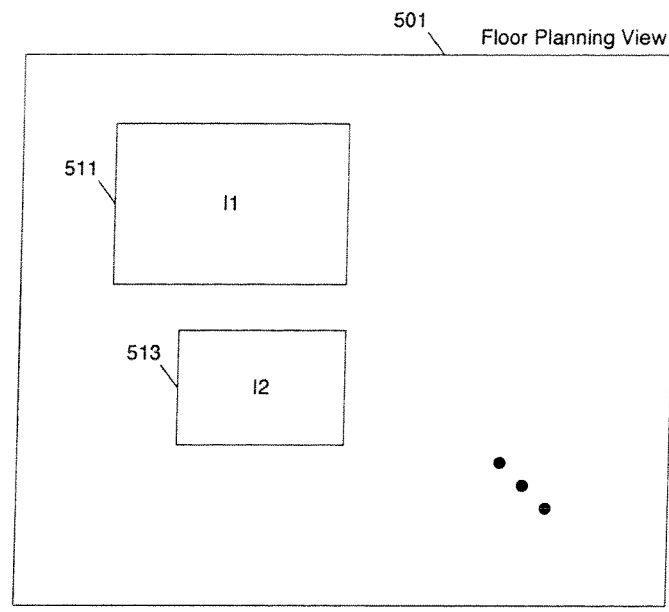
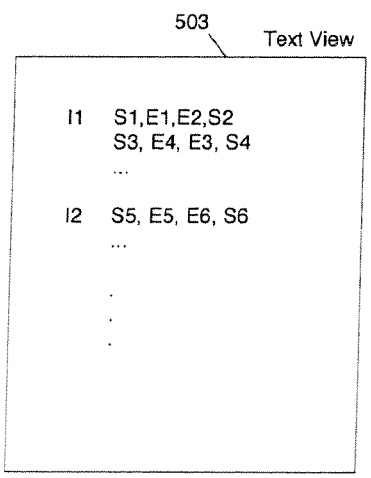
Fig. 5

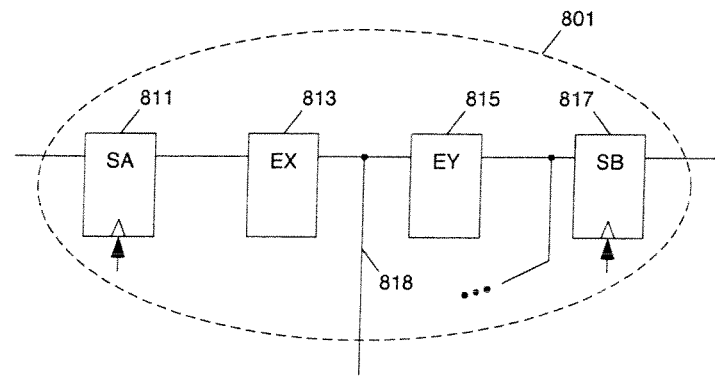
Insert Buffer
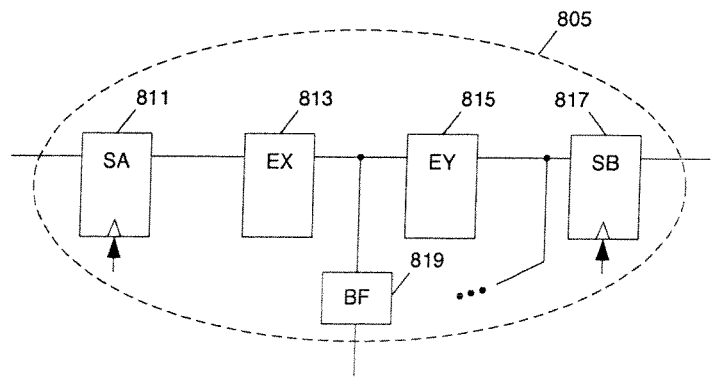
Fig. 8

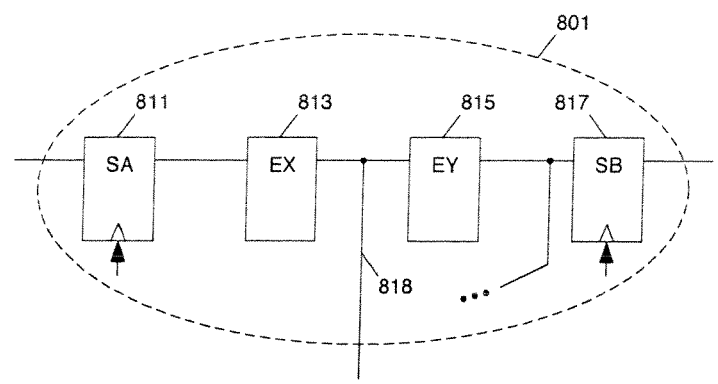
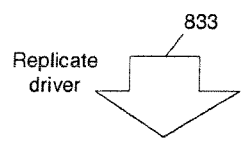
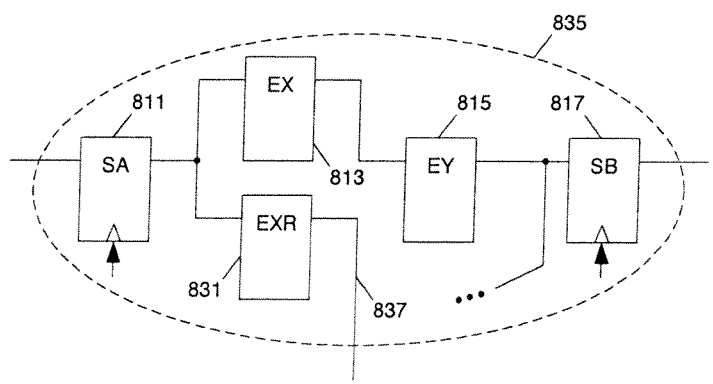
Fig. 9

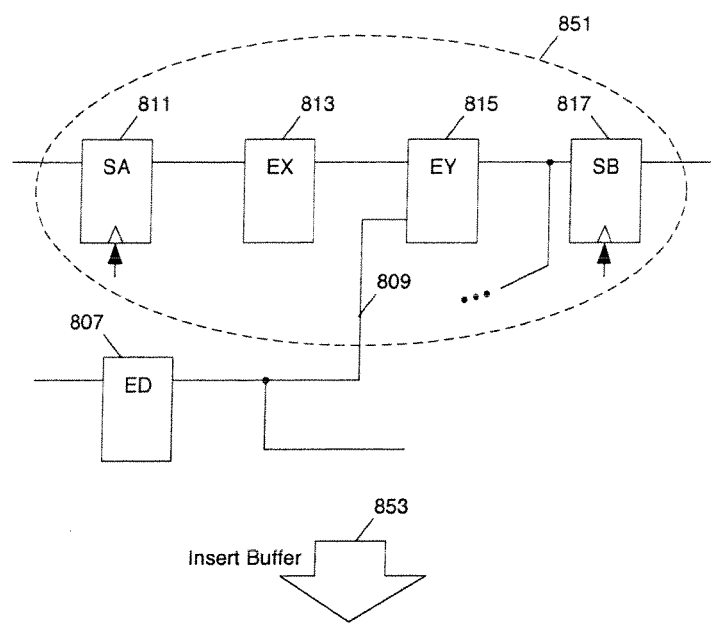
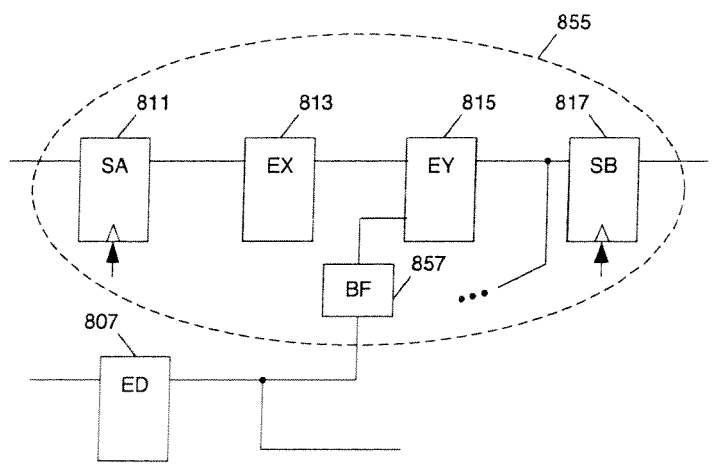
Fig. 10

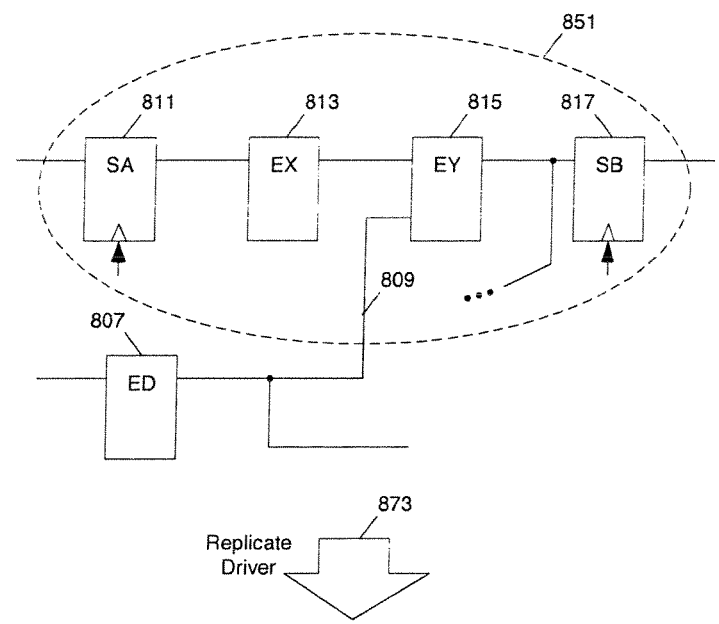
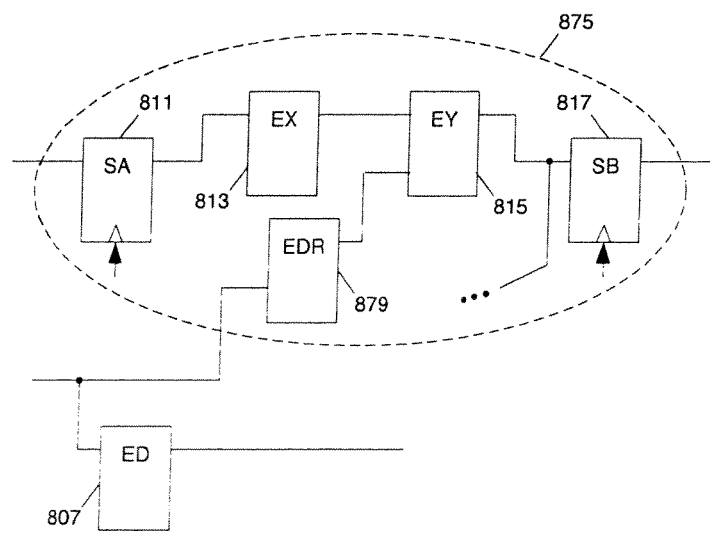
Fig. 11

METHODS AND APPARATUSES FOR CIRCUIT DESIGN AND OPTIMIZATION

This application is a divisional of U.S. patent application Ser. No. 12/363,212, filed on Jan. 30, 2009, now U.S. Pat. No. 8,307,315 issuing on Nov. 6, 2012.

TECHNOLOGY FIELD

The invention relates to circuit design, and more particularly to the analysis and synthesis of a design of a circuit.

BACKGROUND

For the design of digital circuits (e.g., on the scale of Very Large Scale Integration (VLSI) technology), designers often employ computer-aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning." A typical floor planning operation divides the circuit area of an integrated circuit into regions, sometimes called "blocks," and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and routing typically runs faster because as it has been reduced from one very large problem into a series of simpler problems.

After placement of components on the chip and routing of wires between components, timing analysis (e.g., transient timing simulation, or static timing analysis) can be performed to accurately determine the signal delays between logic elements. Back annotation can be performed to update a more-abstract design with information from later design stages. For example, back annotation reads wire delay information and placement information from the placement and route database to annotate the logic synthesis design. Back annotated delay information can be used to identify critical paths where the timing requirements are not satisfied; and logic synthesis may be improved to meet the timing requirements.

After the design layout (e.g., the placement and routing), only limited optimizations like resizing or buffering (known as in place optimizations) are typically performed. However, in place optimizations can provide only limited improvements. When the in place optimization cannot adjust the solution to meet the timing constraint, adjustment to the logic synthesis may be performed, leading to the expensive iteration between logic synthesis and placement and routing.

Timing analysis results can be expressed in terms of slack, which is the difference between the desired delay and the actual (estimated or computed) delay. When the desired delay is larger than the actual delay, the slack is positive; otherwise, the slack is negative. Typically, it is necessary to make the slack positive (or close to zero) to meet the timing requirement (e.g., through reducing the wire delay to increase the slack). For example, during synthesis, a total negative slack algorithm (e.g., used in a circuit design compiler, Synplify, available from Synplicity, Inc., California) considers all instances whose slack is negative as candidates for improvement, since any one of the candidates with negative slack could become critical after physical design. It is typical to make the slack positive to ensure that the timing requirements are met.

After the synthesis transformation, the placement and routing is performed to generate a technology/architecture dependent design layout, which can be implemented on a vendor's technology/architecture dependent integrated circuit, such as field programmable gate arrays (FPGA) or an application-specific integrated circuit (ASIC).

SUMMARY OF THE DESCRIPTION

Methods and apparatuses for a design of a circuit are discussed. In one aspect of an embodiment, a method for designing a circuit includes identifying one or more first portions of a design of a circuit, each of the one or more first portions containing a set of elements interconnected via timing nets and generating weights for the timing critical nets, the weights being generated after identifying the one or more first portions and executing a placer algorithm which uses the weights for the timing critical nets to place the set of elements on a representation of the design. In this method, in one embodiment, the weights for the timing critical nets can be generated to have values that differ from weights for non-critical nets. The placer algorithm can be any one of a variety of conventional placer algorithms such as a weighted wire length driven placer algorithm or a force directed timing driven placer algorithm or a min-cut placer algorithm.

The placer algorithm can provide a full placement solution for all elements of the design and in certain embodiments can provide a refined placement solution for less than all of the elements of the design. In one implementation of this embodiment, the identifying of the timing islands and the generating of the weights for the timing critical nets in those timing islands and the executing of the placer algorithm may be performed iteratively until a placement solution is decided to converge to a desired result. In one implementation, the method can further include generating at least one additional net(s) that does not represent an electrical connection, the at least one additional net being within only a timing island, and the placer algorithm uses the at least one additional net (which may be referred to as a pseudonet) as a hint to provide a placement solution.

The present invention includes methods and apparatuses which perform these methods, including data processing systems which perform these methods, and computer readable media which when executed on data processing systems cause the systems to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3 illustrates a way to display timing analysis results according to one embodiment of the present invention.

FIG. 5 illustrates floor planning based on timing structures of a circuit according to one embodiment of the present invention.

FIGS. 8-11 illustrate synthesis transformations to isolate timing dependency for the timing structures of a circuit according to embodiments of the present invention.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

When analyzing the critical timing in a design, it is rare to find a case where there is a single critical path. A critical path can be considered to be a path or net which does not satisfy a timing requirement. A path includes two end points connected by a number of circuit connections (nets) and circuit elements. An end point is typically a sequential element (e.g., a register, a flip-flop, a memory element, etc.) or a port or pin of a module.

Commonly there is a section of the design where there are a number of critical paths that share common intermediate combinatorial instances. Thus, these critical paths are directly interconnected with each other to form a timing critical section (or timing critical net) of the design. Such collection of timing critical instances that share connectivity with a critical path may be called an island. Given a design that fails to meet timing requirements, it is common for the design to contain multiple islands.

Figure 1:
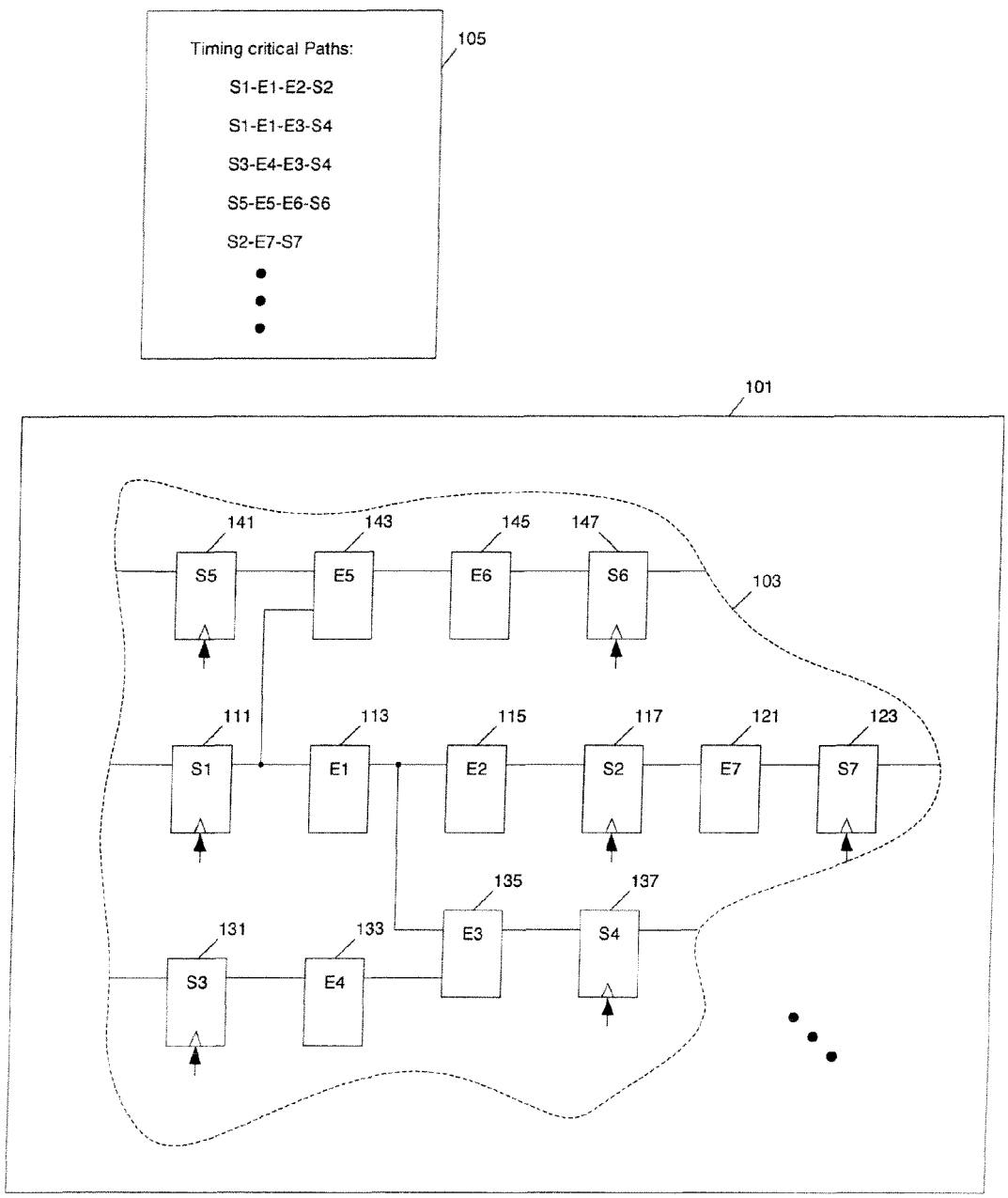
FIG. 1 illustrates a method to extract a timing critical portion of a design of a circuit according to one embodiment of the present invention.

FIG. 1 illustrates a method to extract a timing critical portion of a design of a circuit according to one embodiment of the present invention.

A timing analysis typically can provide the timing analysis result (105) that includes the list of timing critical paths of the design (101) of a circuit.

For example, according to the timing analysis result (105), a portion (103) of the circuit design includes a number of timing critical paths. The path (S1-E1-E2-S2) from sequential element S1 (111) to element E1 (113), element E2 (115) and sequential element S2 (117) is a critical path. Further, the path (S1-E1-E3-S4) from sequential element S1 (111) to element E1 (113), element E3 (135) and sequential element S4 (137) is also a critical path. Thus, critical paths (S1-E1-E2-S2) and (S1-E1-E3-S4) share elements and interconnect directly with each other. Therefore, critical paths (S1-E1-E2-S2) and (S1-E1-E3-S4) can be considered as on a same island which is a timing critical portion of the design.

Further, the path (S3-E4-E3-S4) from sequential element S3 (131) to element E4 (133), element E3 (135) and sequential element S4 (137) is also a critical path. Thus, the critical path (S3-E4-E3-S4) is also on the same island.

The path (S2-E7-S7) from sequential element S2 (117) to element E7 (121), and sequential element S7 (123) is also a critical path. Since paths (S1-E1-E2-S2) and (S2-E7-S7) share the same sequential element S2, they can be considered as on the same island. Alternatively, since paths (S1-E1-E2-S2) and (S2-E7-S7) pass cross the sequential element S2, they may be considered as on different islands. Thus, according to a design or implementation preference, the islands may or may not expand across end points.

The path (S5-E5-E6-S6) from sequential element S5 (141) to element E5 (143), element E6 (145) and sequential element S6 (147) is also a critical path. Timing critical path (S5-E5-E6-S6) is on an island. However, since the path (S1-E5-E6-S6) is not a critical path, path (S5-E5-E6-S6) is not directly connected to the island of paths (S1-E1-E2-S2), (S1-E1-E3-S4), and (S3-E4-E3-S4). Thus, path (S5-E5-E6-S6) is on a different island.

In one embodiment of the present invention, the extraction of an island starts from a critical path. Any other critical path that shares one or more intermediate element, or the same starting point, or the same ending point are selected as being on the same island with the critical path. The expansion of the island can be optionally allowed to pass across end points. For example, if two paths that share the sequential element but one as the starting point and the other as the ending point, these two paths may optionally be considered as on the same island.

In one embodiment of the present invention, the elements of the first critical path are added to the island. If another critical path has a same element as the island, the elements of this critical path are also added into the island; and this critical path is marked as on the island. Thus, the island can be expanded in this fashion until it is determined that critical paths are either on the island or not on the island. A critical paths not on the island can then be selected as the seed for the next island, which can be expanded in the similar fashion. Through such a process, the critical paths can be grouped into islands.

Alternatively, islands can be extracted through examining the nets connected to the already identified elements of the elements. During the expansion of an already identified portion of an island, if a net driving an element of the island is critical (on a critical path), the driver element of the net is also on the island. Similarly, if a net that is being driven by an element of the island is critical (on a critical path), the critical load elements of the net are also on the island. The expansion may or may not cross end points (e.g., sequential elements). Thus, each island represent a single critical-net-connected graph of elements. In a connected graph, any two has a connected path in between.

Islands may be graphically visualized when the circuit design is represented on a three-dimensional graph where instances are assigned a "height" or altitude attribute according to the negative slack.

Figure 2:
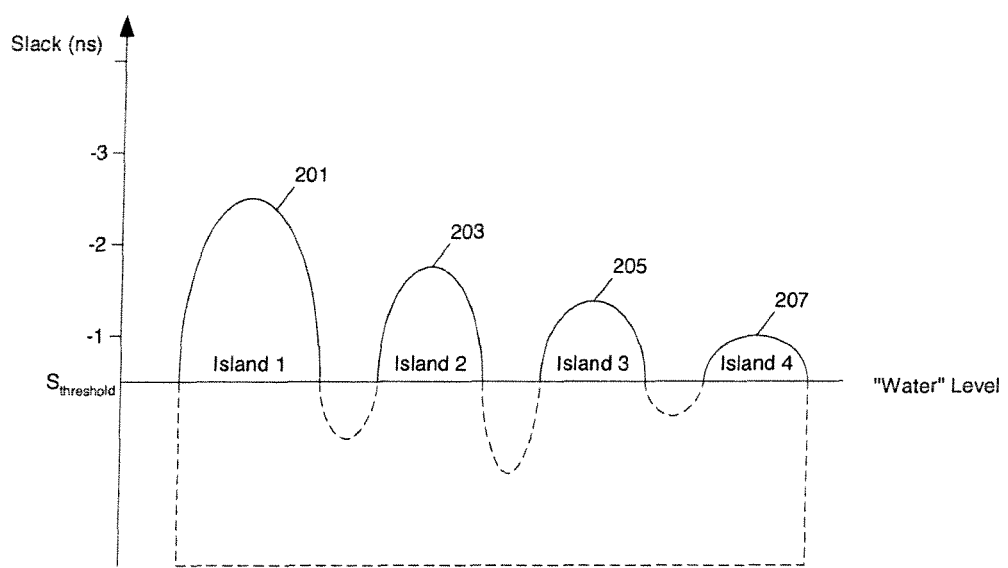
FIG. 2 illustrates a way to visualize the timing structure of a circuit according to one embodiment of the present invention.

FIG. 2 illustrates a way to visualize the timing structure of a circuit according to one embodiment of the present invention.

In FIG. 2, instances interconnected by the nets have a "height" according to their negative slack. A threshold ($S_{threshold}$) is used to define a desired critical level. A critical slack is less than $S_{threshold}$; and a non-critical slack is more than $S_{threshold}$. Thus, the threshold ($S_{threshold}$) defines the "water" level for defining the islands (201, 203, 205, 207). The elements in an island (e.g., 201) have critical nets that interconnect the elements of the island. No critical net interconnects the elements of two different islands. Under the "water" level, the non-critical elements and non-critical nets connect the islands together to form the connected circuit.

From FIG. 2, one can see the timing critical portions of the circuit and the timing structure of the circuit. Such timing structures of circuit are typically different from function-based module hierarchy.

Critical paths often span across function-based module hierarchy. Floor planning logical blocks often degrades performance. From FIG. 2, it is seen that the island extraction is connectivity and timing-based. The islands represent the physical hierarchy where instances of a collection are physically interconnected. The summit of an island is a most critical path of the collection. Lower altitudes of island contain near critical paths.

The display of islands can provide guidance to RTL design planning. For example, the islands indicate which RTL objects should be floor planned together. Different islands can be floor planned into separate regions. When a design contains very large islands, the RTL design may be re-coded to break up the islands.

A hierarchical island-based timing report can be used to provide easy understanding of critical paths. The hierarchical island-based timing report contains a hierarchical display for groups of connected critical paths, islands, enabling faster timing closure. In one embodiment, after the timing analysis and island extraction, the results are saved to the hierarchical based island timing report file. The timing results are organized in the hierarchy of islands, critical paths, and element instances. The timing report is useful when creating physical constraints by identifying which instances belong to multiple critical paths and how the critical paths in an island group are connected together.

In one embodiment, an island timing report is a substantially textual report that lists the islands and their slack values.

In one embodiment of the present invention, the island timing report can be used to select start and end points for a single island, cross-probe to the other views, such as a gate view, HDL view, RTL view (such as the RTL view shown in FIG. 1), technology view, physical view, etc. An HDL view shows the HDL design of the circuit. An RTL view shows the RTL schematic of the circuit design. A technology view shows the synthesized schematic of the technology-mapped circuit design. A physical view shows the physical layout of the placement design.

For example, the island-based cross-probe can be used to show a filtered RTL view that contains all the start and end points for the island. The paths can be further expanded to show a filtered RTL view that contains all the instances in the island. These instances can be selected and assigned to a block region.

In one embodiment, post placement and routing timing information can be back annotated into the database to provide an island timing report that has the accurate timing information.

In one embodiment, the island timing report provides information about groups of critical instances that cannot easily be obtained in traditional path-only based timing reports. Using the island timing report, an engineer can quickly and easily identify the instances that will benefit from being constrained to a block region. Cross-probing from the island timing report to an HDL analysis view or solution makes it fast and easy to apply physical constraints to the islands identified in the report.

FIG. 3 illustrates a way to display timing analysis results according to one embodiment of the present invention.

In FIG. 3, a hierarchical island-based timing report (305) provides icons representing individual islands (e.g., 315) and icons representing individual paths (e.g., 317) in the islands. For each of the critical paths in an island, the worst slack and the longest path delay are presented. The display of islands can be expanded to show the paths within the islands (e.g., by selecting the icon 311 to show the paths in "island 2"). The display of islands can also be collapsed to hide the paths within the corresponding islands (e.g., by selecting the icon 313 to hide the paths in "island 1").

When an island is selected, selecting the button "Detail" (303) allows the user to see the further detailed timing information about the island.

When an island is selected, selecting the button "Cross Probe" (301) allows the user to see the island in other views, such as in an HDL view, an RTL view (e.g., technology dependent or technology independent), a physical view, etc.

Figure 4:
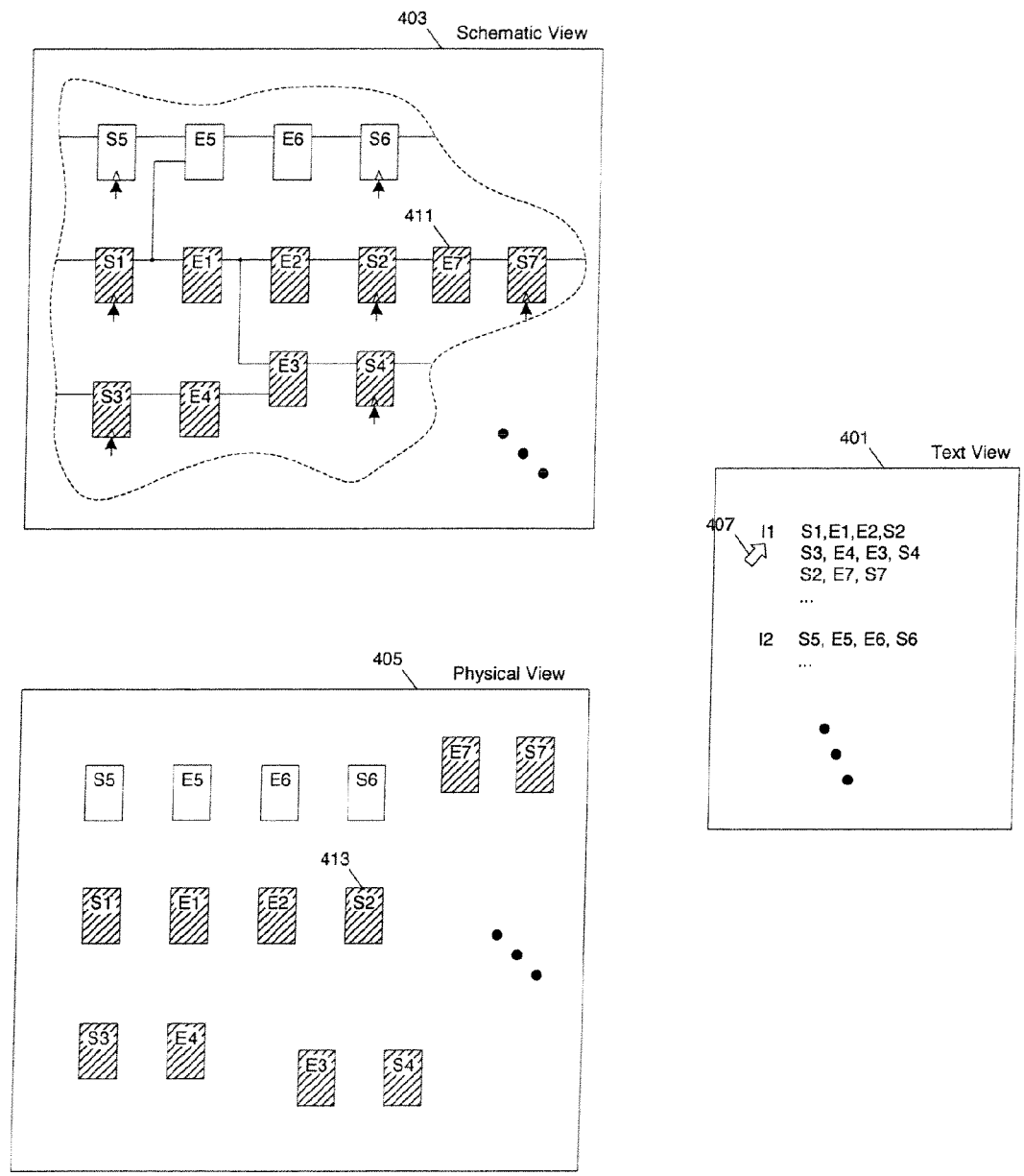
FIG. 4 illustrates cross probing based on timing structures of a circuit according to one embodiment of the present invention.

FIG. 4 illustrates cross probing based on timing structures of a circuit according to one embodiment of the present invention.

In FIG. 4, when the user selects island "I1" in the text view (401) using the cursor (407), the element instances in the schematic view (403), or physical view (405), of the island is highlighted, according to user-selected options. In FIG. 4, all element instances of the cross-probed island are highlighted. Alternatively, the user may select to highlight only the end points.

FIG. 5 illustrates floor planning based on timing structures of a circuit according to one embodiment of the present invention.

In FIG. 5, the user can select an island from the text view (503) and assign the island to a block of a floor planning view (501) (e.g., block 511 or 513). In one embodiment, the circuit is only partially floor planned, which allows the design tool to have more room to optimize the layout for the remaining portion of the circuit. Floor planning the islands without floor planning the remaining portion of the circuit can lead to fast and better solutions.

Traditionally, the floor planning is based on the logical function blocks. Since the hierarchy of the logical function blocks may not reflect the timing structure of the circuit, the traditional floor planning approach require a high level of expertise to achieve timing closure (meet the timing requirements).

When the information about the islands is available, the floor planning based on the islands becomes much easier.

Figure 6:
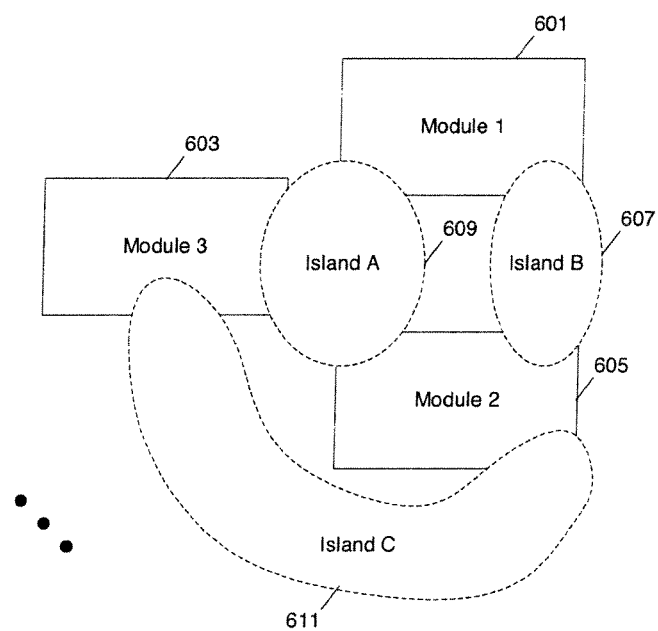
FIG. 6 illustrates a method to report module dependency based on timing structures of a circuit according to one embodiment of the present invention.

FIG. 6 illustrates a method to report module dependency based on timing structures of a circuit according to one embodiment of the present invention.

In FIG. 6, the modules (601, 603, 605) represent the traditional logic-based function blocks. To understand the timing dependency between the modules, the timing critical paths between the modules can be identified and displayed.

In one embodiment of the present invention, the timing critical paths between the modules are grouped as islands (e.g., 607, 609 and 611). Thus, the timing dependency between the modules can be presented in a hierarchical island-based report.

In one embodiment, the timing critical paths that interconnect the modules are identified. The islands are extracted from the timing critical paths.

Alternatively, the islands may be extracted from the timing critical paths of the entire design. The timing critical paths within the islands that interconnect the modules can then be identified and presented in association with the islands.

Figure 7:
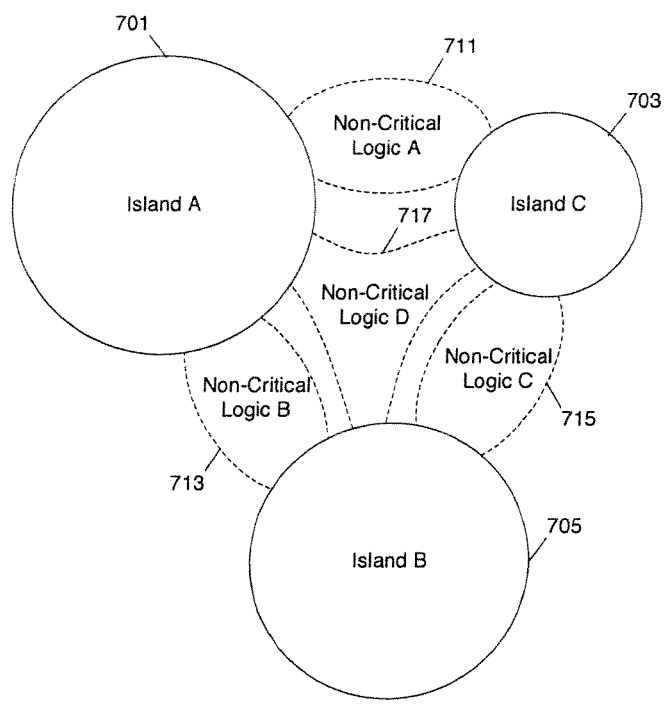
FIG. 7 illustrates a method to report circuit dependency based on timing structures of a circuit according to one embodiment of the present invention.

FIG. 7 illustrates a method to report circuit dependency based on timing structures of a circuit according to one embodiment of the present invention.

In FIG. 7, islands (701, 703 and 705) represent different portions of timing critical circuits. Non-critical logic (e.g., 711, 713, 715, 717) generally interconnects the islands. When the placement of the islands is changed, portions of the non-critical logic may become critical. Thus, it is helpful to understand the criticality of the non-critical logic that connects to the islands.

Further, two islands with many connections may be floor planned close to each other.

In one embodiment of the present invention, affinity scores are used to present the relationships between the islands. In one embodiment, an affinity score between two islands increases as the number of paths between the islands increases and as the slacks of these paths decrease. Thus, two islands with a high affinity score are to be floor planned close to each other than to other islands.

In one embodiment of the present invention, synthesis transformations are performed to isolate timing criticality within the islands. Once the islands are isolated, the islands can be more easily floor planned; and timing closure can be achieved faster.

FIGS. 8-11 illustrate synthesis transformations to isolate timing dependency for the timing structures of a circuit according to embodiments of the present invention.

In FIG. 8, an island (801) includes elements (811, 813, 815, 817, ... ). Element (813) drives the net (818) which is not critical. However, increasing the wire length for the net (818) may increase the capacitive load of the element (813), which may slow down the element (813). To isolate the effect of the capacitive coupling on the speed of the element (813), a synthesis transformation (803) can be performed to insert a buffer (819) to isolate the timing dependency within the island (805). The inserted buffer (819) is considered as a part of the island so that the element instances within the island are floor planned in the same block.

FIG. 9 illustrates an alternative synthesis transformation (833) to isolate the timing island (801). In FIG. 9, the driver (813) is replicated. The replicated instant (831) drives the non-critical net (837) and thus isolates the timing dependency within the island (835).

In FIG. 10, an island (851) includes elements (811, 813, 815, 817, ... ). Element (815) is driven by the net (809) which is non-critical. However, increasing the wire length for the net (809) may degrade the signal driven by the element (807), which can slow down the element (815). To isolate the change in wire length of the net (809) on the speed of the element (815), a synthesis transformation (853) can be performed to insert a buffer (857) to isolate the timing dependency within the island (855). The inserted buffer (855) is considered as a part of the island so that the element instances within the island are floor planned in the same block.

FIG. 11 illustrates an alternative synthesis transformation (873) to isolate the timing island (851). In FIG. 11, the driver (807) is replicated. The replicated instant (879) drives the element (815) through a short net and thus isolates the timing dependency within the island (875). The replicated driver 879 is considered part of the island 875.

Figure 12:
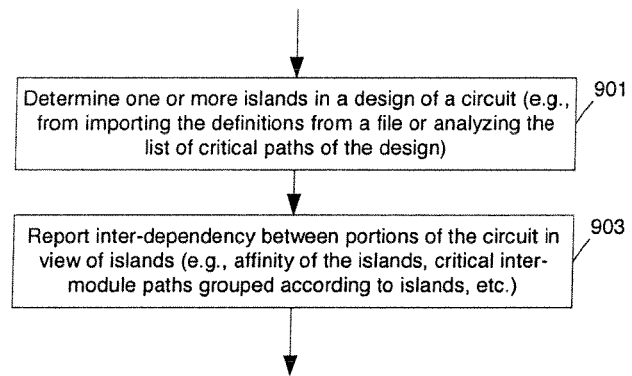
FIGS. 12-14 illustrate methods of utilizing identified timing structures of a circuit for circuit design and optimization according to embodiments of the present invention.
Figure 13:
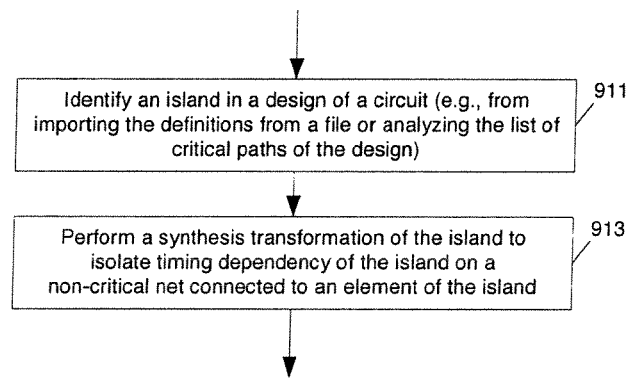
Figure 14:
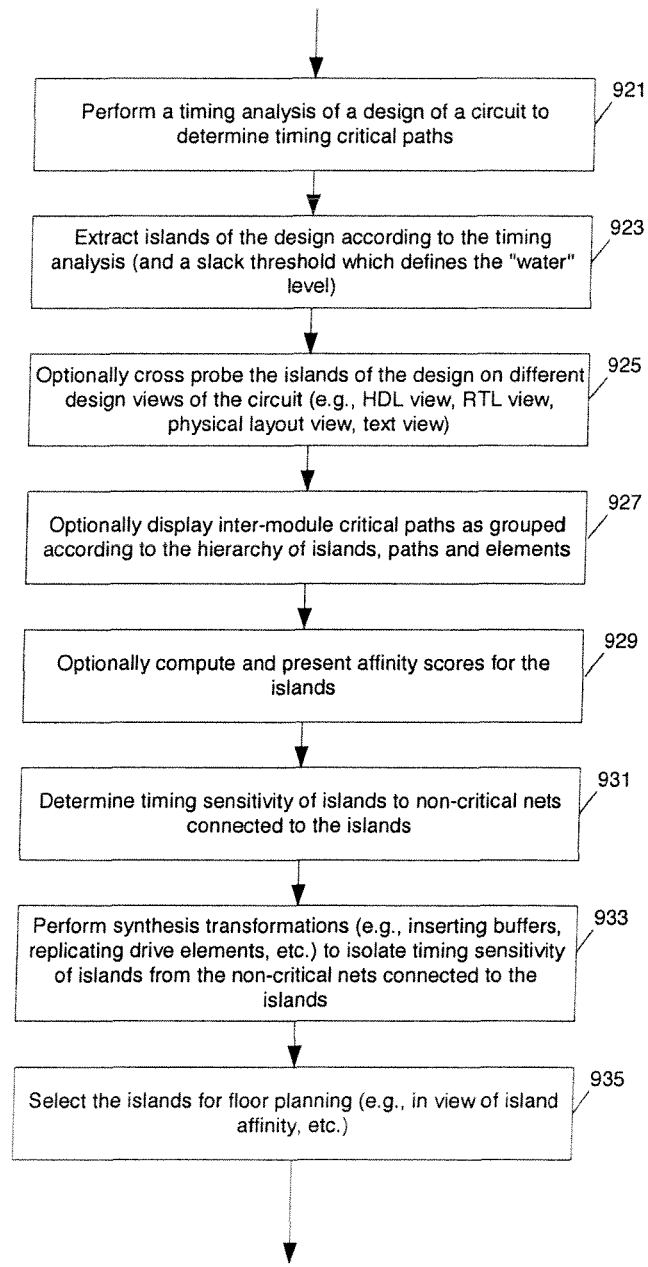

FIGS. 12-14 illustrate methods of utilizing identified timing structures of a circuit for circuit design and optimization according to embodiments of the present invention.

In FIG. 12, after operation 901 determines one or more islands in a design of a circuit (e.g., from importing the definitions from a file or analyzing the list of critical paths of the design), operation 903 reports inter-dependency between portions of the circuit in view of islands (e.g., affinity of the islands, critical inter-module paths grouped according to islands, etc.).

In FIG. 13, after operation 911 identifies an island in a design of a circuit (e.g., from importing the definitions from a file or analyzing the list of critical paths of the design), operation 913 performs a synthesis transformation of the island to isolate timing dependency of the island on a non-critical net connected to an element of the island.

In FIG. 14, operation 921 performs a timing analysis of a design of a circuit to determine timing critical paths. Operation 923 extracts islands of the design according to the timing analysis (and a slack threshold which defines the "water" level).

Optionally, operation 925 cross probes the islands of the design on different design views of the circuit (e.g., HDL view, RTL view, physical layout view, text view).

For example, one can view the elements of an island highlighted in the physical layout view. If the elements of the island scatter in the physical layout view, it is an indication that the timing of the island can be significantly improved if the island is floor planned in a block.

For example, one can inspect the HDL view to decide whether or not to change the design to break up large islands.

Optionally, operation 927 displays inter-module critical paths as grouped according to the hierarchy of islands, paths and elements. The hierarchical presentation of islands, paths and elements for critical paths that interconnect modules helps a designer to visualize the timing problems.

Optionally, operation 929 computes and presents affinity scores for the islands. When the floor planning the islands, the affinity of the islands helps a designer to determine the relative positions of the islands with respect to each other.

Operation 931 determines timing sensitivity of islands to non-critical nets connected to the islands. Operation 933 performs synthesis transformations (e.g., inserting buffers, replicating drive elements, etc) to isolate timing sensitivity of islands from the non-critical nets connected to the islands. Once the islands are not sensitive to the non-critical nets, different islands can be more freely floor planned into different blocks. Operation 935 selects the islands for floor planning (e.g., in view of island affinity, etc.).

Certain aspects of the invention relate to the use of timing island information in various parts of the circuit design process or flow (e.g. design of VLSI ASICs or FPGAs). For example, the timing island information can be used during the process or flow of placing circuit components in the circuit design process or flow.

A placement process during VLSI design (ASIC/FPGA) determines the physical locations of circuit components on the semiconductor chip. The components cannot be overlapping with each other. One of the objectives of the placement process is to minimize the sum of length of the nets (connections) which connect the circuit components. The nets represent the electrical connections between the circuit components. The timing delay through a net is proportional to the length of the net (the exact relation between net length and delay is complex and can be different for different semiconductor technologies like FPGAs/ASICs). Net lengths are affected by the physical locations of the driving component and the load components of the net. Hence actual physical locations of the circuit components affect the timing characteristics of the circuit. Timing-driven placement seeks to minimize the delay of the longest valid timing path in the circuit (or maximize the worst slack of the design). In the industry/academia VLSI placement process is performed by various types of algorithms such as min-cut partitioning, simulated annealing, force directed, analytical etc. In one embodiment of the invention, the timing island information can be used during the process of automatic timing driven placement to generate better placements of the circuit components that maximizes the slack of the worst timing path in the design.

The following references describe various placement algorithms which can be used with the timing island information in the embodiments described herein. Quadratic placement techniques are described in "Fast And Robust Quadratic Placement Combined With An Exact Linear Net Model," Peter Spindler, Frank M. Johannes, November 2006, *ICCAD '06: Proceedings of the 2006 IEEE/ACM International Conference on Computer-aided Design*. Analytical placement techniques are described in "Architecture and Details of a High Quality, Large-Scale Analytical Placer," A. B. Kahng, S. Reda and Q. Wang, *Proc. ACM/IEEE Intl. Conference on Computer-Aided Design*, November 2005; and in "Multilevel Generalized Force-Directed Method for Circuit Placement," Tony F. Chan, Jason Cong, and Kenton Sz, Proceedings of the International Symposium on Physical Design, pp. 185-192, April 2005. A min-cut placement technique is described in "Unification of Partitioning, Floorplanning and Placement," S. N. Adya, S. Chaturvedi, J. A. Roy, D. A. Papa and I. L. Markov, *Intl. Conference on Computer-Aided Design* (ICCAD 2004), pp. 550-557. A min-cut partitioning and VLSI clustering technique is described in "Multilevel Hypergraph Partitioning: Applications in VLSI Design," G. Karypis, R. Aggarwal, V. Kumar, and S. Shekhar, *Proc. ACM/IEEE Design Automation Conf.*, 1997, pp. 526-529. A forcer directed placer algorithm is described in two U.S. patent applications which are incorporated by reference: U.S. application Ser. No. 12/177,867 filed on Jul. 22, 2008, titled "Architectural Physical Synthesis" and U.S. application Ser. No. 12/177,869 filed on Jul. 22, 2008, titled "Architectural Physical Synthesis".

Based on a certain slack threshold, timing island information can be generated to capture the timing structures and timing dependency of the circuit. Objects in the same timing islands have a certain affinity with each other since they are connected (either directly or transitively) by nets and are also the critical part of the circuit. Since the lengths of nets effect the timing of the circuit, it would be advantageous to try and keep the lengths of nets connecting components on the same timing island, small in order to minimize the delay of the timing paths through the timing island which is critical.

Depending on the specific placement algorithms used during the automatic VLSI placement procedure, several strategies may be employed to achieve the objective of keeping the nets connecting components on the same timing island, small. These are described herein and are also shown in FIGS. 15A, 15B, 15C, 16A, 16B, and 17.

Figure 16A:
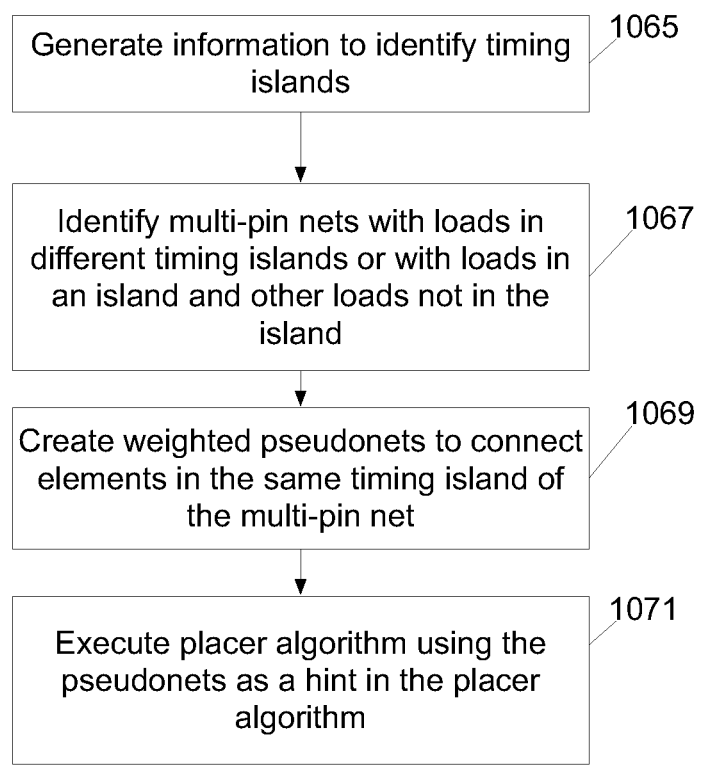
FIG. 16A shows an example of a method for creating pseudonets which are used in a placer algorithm according to at least certain embodiments.
Figure 16B:
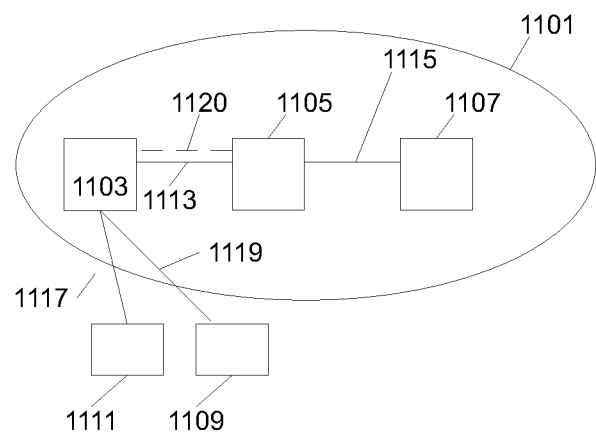
FIG. 16B shows an example of a pseudonet.

Before the placement procedure starts one could identify timing islands based on estimated lengths/delays of the nets (wireload models). This is shown in operation 1005 if FIG. 15A, which operation follows operations 1001 and 1003 in the circuit design flow or method of FIG. 15A. Since the timing information is based on estimated net lengths, it is not very accurate. Once the timing island information is generated the nets that connect the components on the same timing islands can be assigned higher weights (such as operation 1007 in FIG. 15A). A black box placer that minimizes the weighted wirelength (sum of all nets in the circuit) can then be used (in operation 1009) to place the appropriately weighted circuit netlist on the semiconductor fabric. The placer algorithm used in operation 1009 can be one of a variety of placer algorithms, such as a weighted wire length driven placer algorithm. The placer should ensure that the higher weighted nets connecting components within the same timing islands are kept short and hence the island is placed in a tight cluster. Multi-pin nets that have loads in different timing islands or having only some loads in a timing island may need to be treated differently since the entire net should not be weighted. This aspect is shown in FIGS. 16A and 16B. In the method of FIG. 16A, operation 1065 identifies timing islands (e.g. in the manner described herein) and produces information to identify such timing islands. Then, in operation 1067, the method identifies multi-pin nets, such as multi-pin nets 1113, 1119, and 1117 shown in FIG. 16B, which connect loads in different timing islands or which connect loads in a timing island and other loads which are not in the timing island. It can be seen that element 1103 in the timing island 1101 is connected by a multi-pin net (e.g. same output drives multiple inputs to other elements) to elements 1105, 1109 and 1111 respectively by nets 1113, 1119 and 1117. In this case a pseudonet 1120 is created; this pseudonet 1120 is effectively a duplicate net between elements 1103 and 1105. In this case one could introduce one or more, in operation 1069, new appropriately weighted additional nets (referred to as pseudonets) that connects only the components of the original net which are in the same timing island. The new additional nets (pseudonets) do not represent an electrical connection, but are only used as hints for the placer in operation 1071.

Figure 15A:
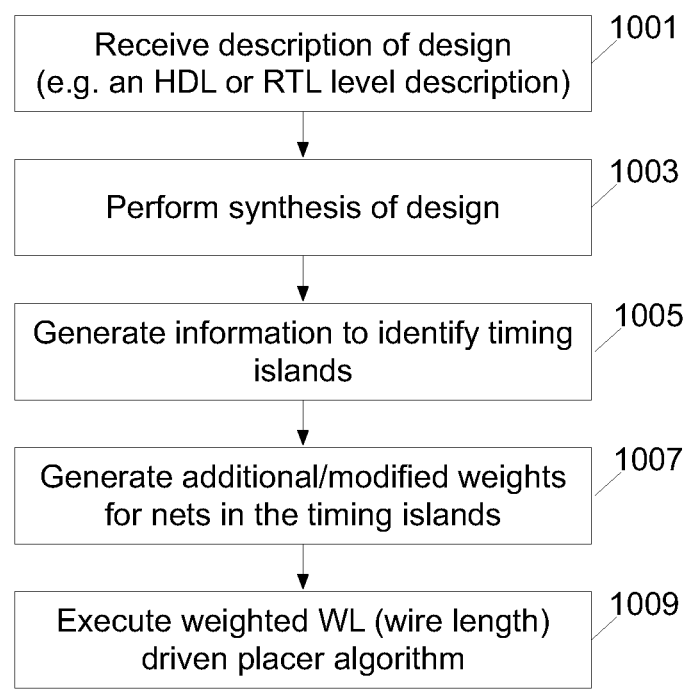
FIGS. 15A, 15B, and 15C show examples of methods that use timing island information in the process of performing placement according to at least certain embodiments.
Figure 15B:
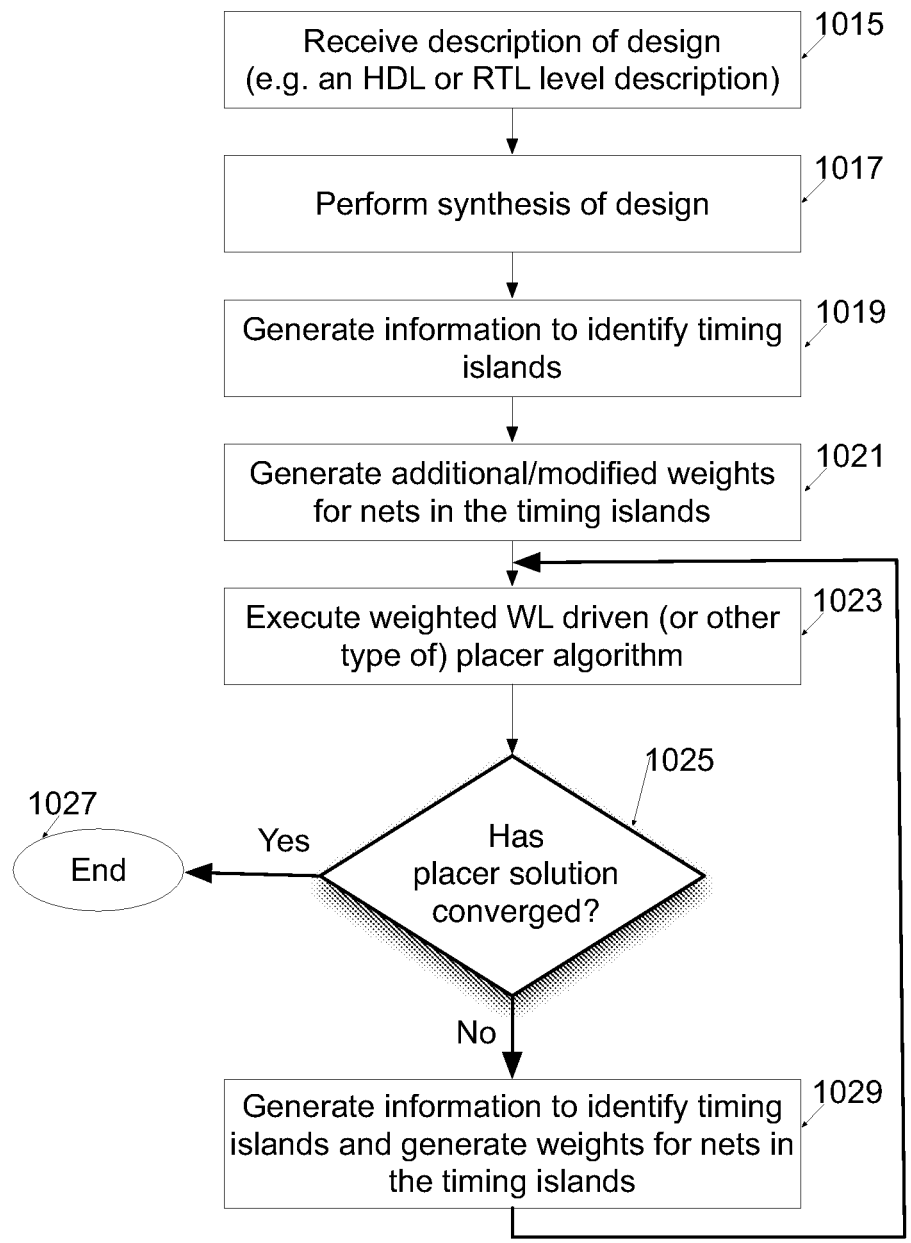
Figure 15C:
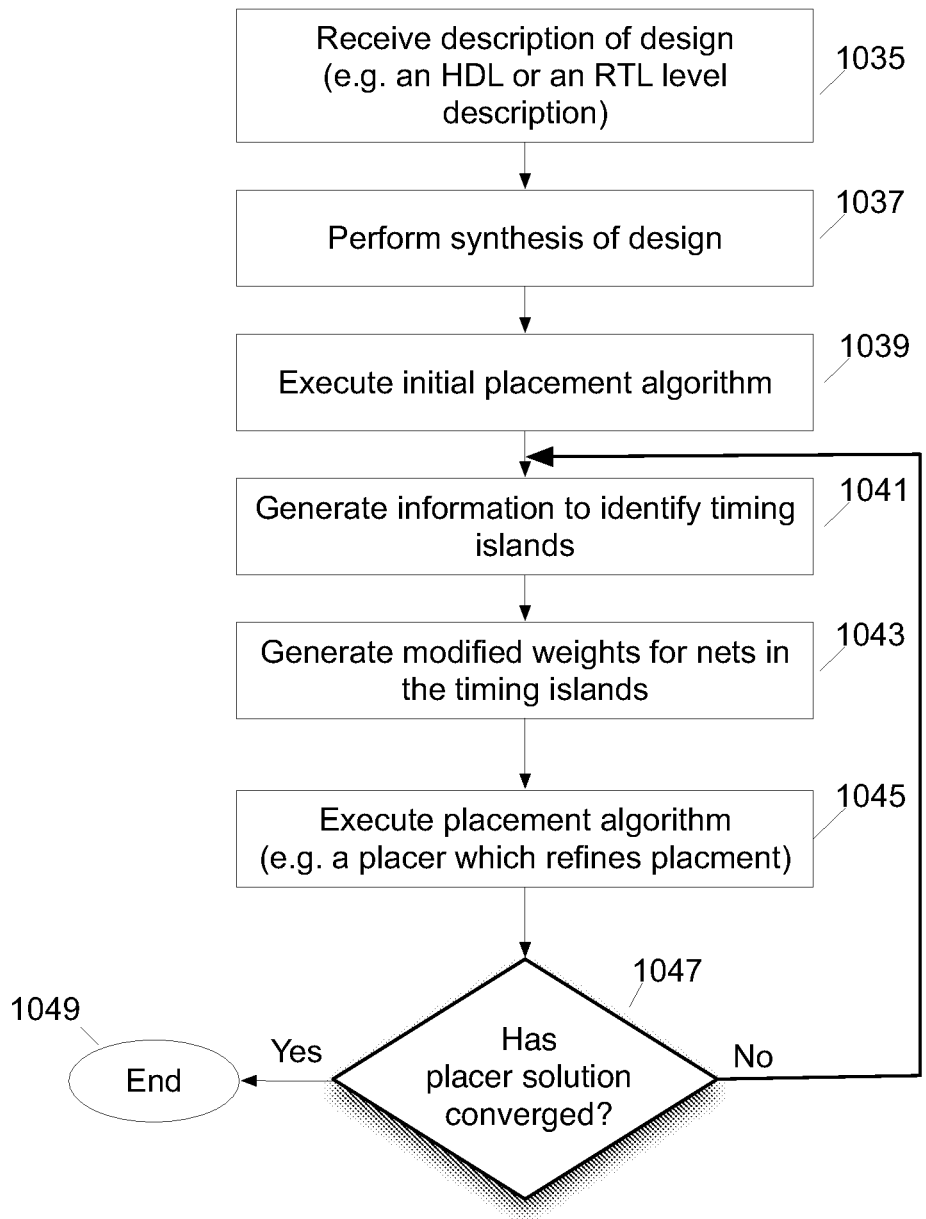

The above technique, while general, may not be very accurate since the initial timing island information is generated based on timing based on estimated net lengths/delays. However the actual net lengths are determined during the placement procedure. The timing characteristics of the circuit change continuously during the placement procedure as the placement of the circuit components is being refined. One embodiment could update the timing island information as a part of the placement procedure. FIGS. 15B and 15C show two examples of such an embodiment. As the placement is being refined, the timing island information could be re-generated. In one embodiment (e.g. operation 1023), the placement algorithm performs/computes a full placement solution, while in another embodiment, the placement algorithm, after an initial placement in operation 1039, performs a partial or refined placement of only some components (while others are not re-placed). Based on the new timing island information, the weights of the nets connecting components in the same timing islands could be re-computed. In this approach the placement procedure is repeatedly self tuning the timing island information to make sure that existing and new timing islands remain in a tight cluster and the length of the nets connecting components on the same timing islands is small until a placer solution converges to satisfy the conventional criteria for a satisfactory placement (e.g. congestion, timing, and overlap; or wire length, timing and overlap, etc.). As described above, the technique of using additional nets (pseudonets) for multi-pin nets that span multiple timing islands or are not a full part of the timing island can be used in this technique also. This technique of using the timing islands can be used within any placement procedure that works in iterations. These include min-cut partitioning based placement, force-directed placement, analytical placement and simulated annealing based placement.

Figure 17:
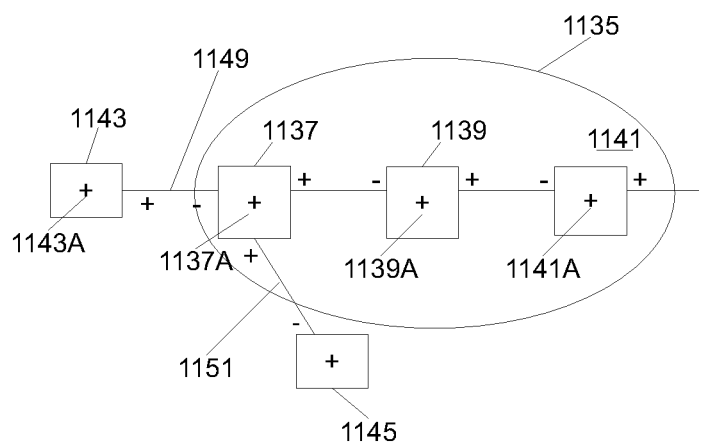
FIG. 17 shows an example of how timing island information can be used with a force driver placer algorithm.

One embodiment of using the timing island information during force directed timing driven placement is illustrated in FIG. 17. Force directed placement is one of the algorithms used in the industry/academia to generate placement of circuit components. The procedure starts with producing a wire-length (sum of all nets in the circuit) minimum solution of the circuit components. The nets can be modeled as attractive forces such as charged particles which attract (such as a positive and a negative particle) and repulsive forces (two particles of the same charge) or springs, etc. FIG. 17 shows that each element (elements 1143, 1137, 1139, 1141, and 1145) is positively charged, tending to repel each other in a placement solution. Positive charges 1143A, 1137A and 1139A represent the positive charge of their respective elements 1143, 1137 and 1139. In addition, each net (such as nets 1149 and 1151) has a positive charge on the output side/end of the net and a negative charge on the input side/end of the net; this helps to reduce wire length of a net as each net will, due to this attractive force, want to shrink. This physical system can be solved using well known mathematical optimization techniques like quadratic programming/non-linear programming. However, this placement solution can have circuit components overlapping with each other which is an illegal placement. The placement procedure then works in iterations to reduce and eventually remove the overlap between the modules. One way to accomplish this spreading of the circuit components is to introduce additional repulsive forces between the circuit components. The system of attractive net forces and repulsive inter component forces can be solved using existing mathematical techniques like quadratic programming/non-linear programming. The spreading (repulsive) forces are added gradually during iterations to the system to spread the components in an orderly fashion to ensure convergence and avoid oscillations. The timing island information can be used/incorporated in the forcer placement process as the placement is being refined (spread). One could accomplish this by reducing the relative strength of the repulsive forces between components belonging to the same timing island as compared to the normal strengths of repulsive forces between other components. This is shown in FIG. 17; the amount of charge 1137A and 1139A (which are in the elements 1137 and 1139 that are part of timing island 1135) can be reduced relative to the positive charge 1143A (and the positive charge of element 1145). The timing island 1135 includes elements 1137, 1139 and 1141 and excludes elements 1143 and 1151. This would ensure that the connected components on the same timing islands spread slower than the other parts of the circuit. At the end of the force-directed placement procedure the components on the same timing islands should be placed, in one embodiment, in a tight cluster with smaller relative span, thus reducing the length of nets connecting the components on the same timing islands.

Figure 18A:
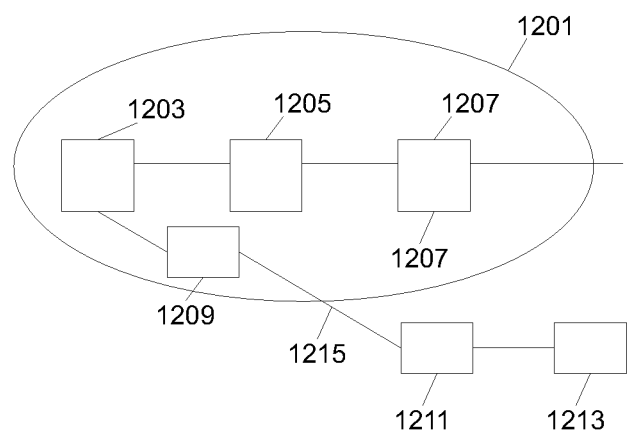
FIG. 18A shows an example of a cluster which has at least one external net.
Figure 18B:
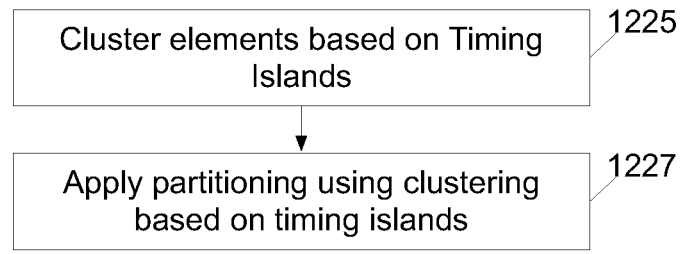
FIGS. 18B and 18C show examples of methods that use timing island information in the process of partitioning of clusters or placing clusters.
Figure 18C:
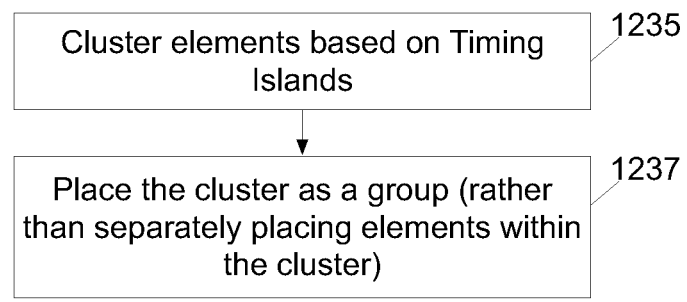

Clustering/packing is used during the VLSI design flow to group several related components in a circuit into a super component or a cluster. Examples of clustering and/or packing are described in the following references: "Multilevel Hypergraph Partitioning: Applications in VLSI Design," G. Karypis, R. Aggarwal, V. Kumar, and S. Shekhar, *Proc. ACM/IEEE Design Automation Conf.*, 1997, pp. 526-529; and "Architecture and CAD for Deep-Submicron FPGAs," V. Betz et al., Springer Series 1999, describes FPGA packing. Clustering can be used in several contexts during the VLSI design flow, such as during coarsening phase of multi-level partitioning/placement or during legal packing generation for LAB (Logic Array Block) level FPGA placement, etc. One of the traditional objectives of clustering is to minimize the external nets of the clustered circuit. An external net of a clustered circuit netlist is a net that is incident on multiple clusters. The net 1215 in FIG. 18A is an example of an external net because it is not entirely contained within the cluster 1201 which includes elements 1203, 1205, 1207, and 1209; the cluster 1201 excludes elements 1211 and 1213. The net 1215 is incident on an element outside of the cluster 1201 and is therefore an external net. An internal net, on the other hand, is incident only on the elements inside a single cluster. Clustering is sometimes used during multi-level placement or LAB level FPGA style placement. When a clustered netlist is placed, all the elements in a cluster are constrained to be placed next to each other. By placing a clustered netlist as a group, the number of placeable objects in the circuit netlist is greatly reduced. FIG. 18C shows an example of a method for using information which identifies timing islands (in operation 1235) in order to create clusters from and/or based on those timing islands and then place each cluster as a group (in operation 1237).

Clustering can also be used during a multi-level min-cut partitioning procedure. Given a top level circuit netlist, one of the traditional objectives of a min-cut partitioning procedure has been to minimize cut nets between two or more child partitions subject to area constraints in each child partition. Clustering can be used to coarsen the initial flat netlist and reduce the number of instances being partitioned so that more efficient partitioning algorithms can be applied on a smaller clustered netlist. FIG. 18B shows an example of a method for using information which identifies timing islands in order to create clusters and then perform partitioning using the clusters created from the timing island information. In addition to reducing the number of external nets and pin connections, timing driven clustering is also of importance to maximize the slack of the circuit by reducing the lengths of critical nets. One can use the timing island information described herein to figure out the affinity of the various components in the circuit. Once the timing island information is generated, during the clustering procedure, there can be a higher cost (weights) for cutting (externalizing) nets that connect components in the same timing islands. Thus the clustering procedure would have more incentive to internalize nets that connect components in the same timing islands. This essentially means that components on the same timing island would be more likely to stay in the same clusters than other components. Depending upon the application of clustering, one embodiment could also make it a hard constraint to keep all components in the same timing island in the same cluster subject to the area constraints on each cluster.

Many of the methods of the present invention may be performed with a digital processing system, such as a conventional, general-purpose computer system. Special purpose computers, which are designed or programmed to perform only one function, may also be used.

Figure 19:
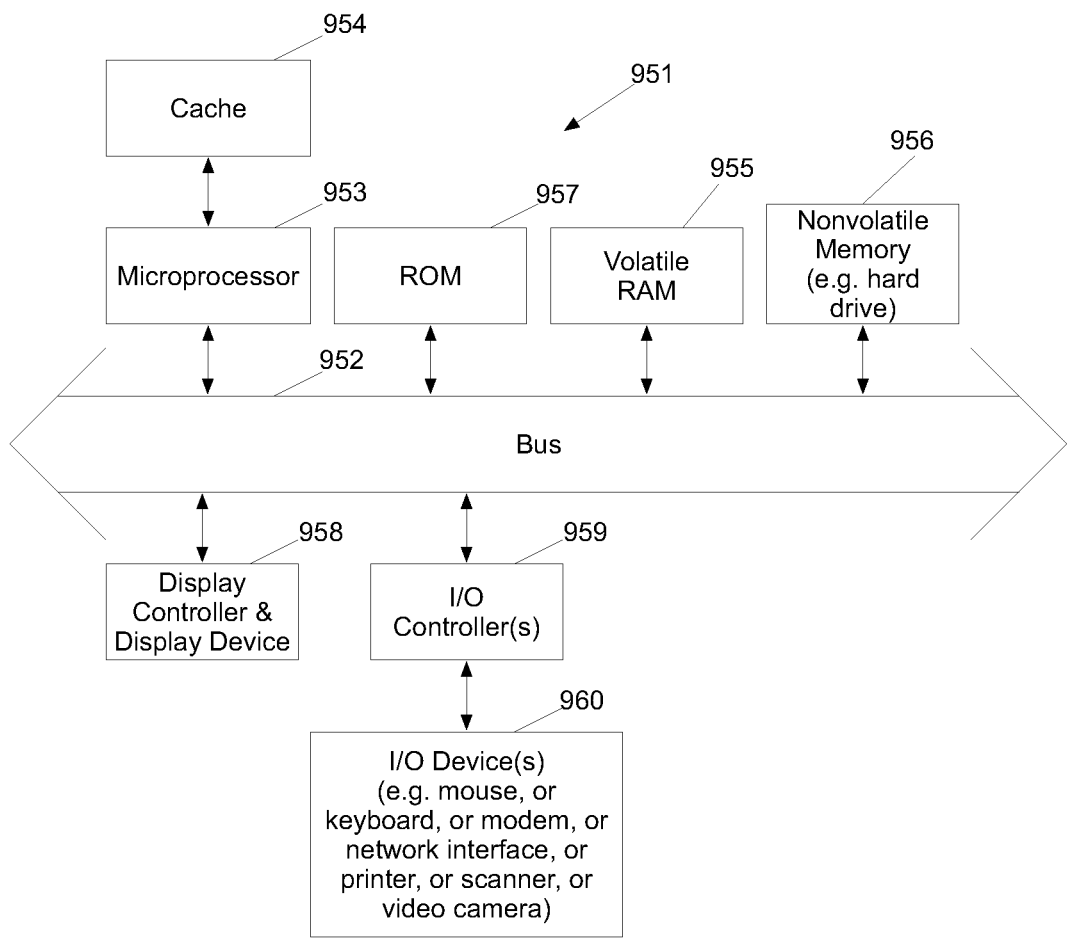
FIG. 19 shows a block diagram example of a data processing system which may be used with the present invention.

FIG. 19 shows one example of a typical computer system which may be used with the present invention. Note that while FIG. 19 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 19 may, for example, be a Sun workstation, or a personal computer (PC) running a Windows operating system, or an Apple Macintosh computer or a Linux system.

As shown in FIG. 19, the computer system 951, which is a form of a data processing system, includes a bus 952 which is coupled to a microprocessor 953 and a ROM 957 and volatile RAM 955 and a non-volatile memory 956. The microprocessor 953 is coupled to cache memory 954 as shown in the example of FIG. 19. The bus 952 interconnects these various components together and also interconnects these components 953, 957, 955, and 956 to a display controller and display device 958 and to peripheral devices such as input/output (I/O) devices which may be mice, keyboards, modems, network interfaces, printers, scanners, video cameras and other devices which are well known in the art. Typically, the input/output devices 960 are coupled to the system through input/output controllers 959. The volatile RAM 955 is typically implemented as dynamic RAM (DRAM) which requires power continually in order to refresh or maintain the data in the memory. The non-volatile memory 956 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 19 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 952 may include one or more buses connected to each other through various bridges, controllers and/or adapters as is well known in the art. In one embodiment the I/O controller 959 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 957, volatile RAM 955, non-volatile memory 956, cache 954 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 953.

A machine readable medium can be used to store software and data which when executed by a data processing system causes the system to perform various methods of the present invention. This executable software and data may be stored in various places including for example ROM 957, volatile RAM 955, non-volatile memory 956 and/or cache 954 as shown in FIG. 19. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented on a data processing system comprising a processor and a memory, the method, upon receipt of at least a portion of an integrated circuit design comprising:

determining timing critical nets for the integrated circuit design using the processor;

identifying a set of elements and nets for each of the timing critical nets;

determining one or more islands from the union of timing critical nets having one or more common elements or nets;

identifying one or more sub-portions of the integrated circuit design corresponding to the islands;

executing a placer which places the one or more sub-portions of the integrated circuit design on a transformed representation of the integrated circuit design, wherein at least one of the determining timing critical nets, identifying a set of elements and nets, determining one or more islands, identifying one or more sub-portions, and executing a placer is performed using the processor; and storing the transformed representation of the design in the memory, wherein the stored transformed representation of the design is used in the creation of an integrated circuit.

2. The method of claim 1, the determining one or more islands from the union of timing critical nets having one or more common elements or nets further comprising:
including a driver element driving a net or element in the island of the net or element; and
including a load element driven by a net or element in the island of the net or element.

3. The method of claim 1, wherein the executing of the placer algorithm provides a full placement solution for all elements of the integrated circuit design.

4. The method of claim 1, wherein the executing of the placer algorithm provides a refined placement solution for less than all elements of the integrated circuit design.

5. The method of claim 1, further comprising:
performing one or more of the determining timing critical nets, the identifying a set of elements and nets, the determining one or more islands, the identifying one or more sub-portions, and the executing a placer algorithm iteratively until a placement solution converges to a desired result.

6. The method of claim 1, wherein the representation of the design is implemented in one or more FPGAs.

7. The method as in claim 6, the identifying one or more sub-portions further comprising:
clustering elements based on the islands; and
applying partitioning using clustering based on the islands.

8. A non-transitory computer readable storage medium storing executable instructions which cause a system to perform a method implemented on a data processing system upon receipt of an integrated circuit design, the method comprising:
determining timing critical nets for the integrated circuit design using a processor in the data processing system;
determining one or more islands from the union of timing critical nets having one or more common elements or nets;
identifying one or more sub-portions of the integrated circuit design corresponding to the islands; and
executing a placer which place the one or more sub-portions of the integrated circuit design on a transformed representation of the integrated circuit design, wherein at least one of the determining timing critical nets, identifying a set of elements and nets, determining one or more islands, identifying one or more sub-portions, and executing a placer is performed using the processor, wherein the transformed representation of the design is used in the creation of an integrated circuit.

9. The medium of claim 8, wherein the executing of the placer algorithm provides a full placement solution for all elements of the design.

10. The medium of claim 8, wherein the executing of the placer algorithm provides a refined placement solution for less than all elements of the design.

11. The medium of claim 8, further comprising:
performing one or more of the determining timing critical nets, the identifying a set of elements and nets, the determining one or more islands, the identifying one or more sub-portions, and the executing a placer algorithm iteratively until a placement solution converges to a desired result.

12. The medium of claim 8, further comprising:
generating at least one additional net that does not represent an electrical connection, the at least one additional net being within only an island; and
using the at least one additional net to provide a placement solution.

13. An emulation data processing system for an integrated circuit design comprising:
computer processor means for determining timing critical nets for the integrated circuit design;
means for identifying a set of elements and nets for each of the timing critical nets;
means for determining one or more islands from the union of timing critical nets having one or more common elements or nets;
means for identifying one or more sub-portions of the integrated circuit design corresponding to the islands; and
computer processor means for executing a placer which places the one or more sub-portions of the integrated circuit design on a transformed representation of the integrated circuit design, wherein at least one of the determining timing critical nets, identifying a set of elements and nets, determining one or more islands, identifying one or more sub-portions, and executing a placer is performed using a processor and wherein the transformed representation of the design is used in the creation of an integrated circuit.

14. The data processing system of claim 13, wherein the means for executing of the placer algorithm provides a full placement solution for all elements of the design.

15. The data processing system of claim 13, wherein the means for executing of the placer algorithm provides a refined placement solution for less than all elements of the design.

16. The data processing system of claim 13, further comprising:
means for performing at least one of the determining timing critical nets, identifying a set of elements and nets, determining one or more islands, identifying one or more sub-portions and the executing iteratively until a placement solution is decided to converge to a desired result.

17. The data processing system of claim 13, further comprising:
generating at least one additional net that does not represent an electrical connection, the at least one additional net being within only an island; and
using the at least one additional net to provide a placement solution.

18. A circuit design tool for an integrated circuit design comprising:
a placer that uses weights for timing critical nets, and places a set of elements on a representation of the integrated circuit design, wherein the integrated circuit design includes one or more first portions, each of the one or more first portions being identified by determining a set of elements shared by the timing critical nets, grouping the timing critical nets into one or more islands based on the set of elements, and the weights for the timing critical nets are generated after identifying the one or more first portions, wherein an output of the circuit design tool is implemented on a computer system including processor and a memory, and a transformed integrated circuit design is stored in the memory and used in the creation of an integrated circuit.

19. The circuit design tool of claim 18, the tool further comprising:
an island generator to determine one or more islands from the union of the timing critical nets based on the set of elements.

20. The circuit design tool of claim 18, the tool further comprising:

a data store for storing the transformed integrated circuit design into memory.

* * * * *